(12) United States Patent
Takahashi et al.

(10) Patent No.: US 10,343,699 B2
(45) Date of Patent: Jul. 9, 2019

(54) AIR CONDITIONER AND RAILCAR

(71) Applicant: KAWASAKI JUKOGYO KABUSHIKI KAISHA, Kobe-shi, Hyogo (JP)

(72) Inventors: Masanori Takahashi, Kobe (JP); Yasuo Onitake, Akashi (JP); Yoshinori Hara, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 724 days.

(21) Appl. No.: 14/364,051

(22) PCT Filed: Nov. 8, 2012

(86) PCT No.: PCT/JP2012/007174
§ 371 (c)(1),
(2) Date: Jun. 9, 2014

(87) PCT Pub. No.: WO2013/088633
PCT Pub. Date: Jun. 20, 2013

(65) Prior Publication Data
US 2014/0335773 A1   Nov. 13, 2014

(30) Foreign Application Priority Data

Dec. 12, 2011   (JP) .................................. 2011-271749

(51) Int. Cl.
*B60H 1/00* (2006.01)
*B60H 1/24* (2006.01)
(Continued)

(52) U.S. Cl.
CPC ....... *B61D 27/009* (2013.01); *B60H 1/00371* (2013.01); *B60H 1/247* (2013.01);
(Continued)

(58) Field of Classification Search
CPC ................ B60K 1/04; B60K 2001/005; B60K 2001/0422; B60L 11/005; B60L 11/1864;
(Continued)

(56) References Cited

U.S. PATENT DOCUMENTS

| 6,508,704 B1 * | 1/2003 | Wilson .................. F24F 13/082 454/277 |
| 2013/0014469 A1 * | 1/2013 | Elwell ................... E04B 1/7076 52/741.4 |

FOREIGN PATENT DOCUMENTS

| DE | 31 31 223 A1 | 2/1983 |
| JP | U-57-138716 | 8/1982 |

(Continued)

OTHER PUBLICATIONS

Jul. 17, 2015 extended Search Report issued in European Patent Application No. 12858179.0.
(Continued)

*Primary Examiner* — Steven B McAllister
*Assistant Examiner* — Allen R Schult
(74) *Attorney, Agent, or Firm* — Oliff PLC (57) ABSTRACT

An air conditioner includes: a suction port; a suction grill provided at the suction port and including a plurality of bars spaced apart from one another and arranged substantially parallel to one another and a suction surface located at suction-side end portions of the plurality of bars; and an air blower configured to suction air from the suction port through the suction grill. Each of the plurality of bars includes an inclined plate portion and a flow straightening plate portion, which are arranged in this order from the suction surface toward a downstream side of the flow of the air, the inclined plate portion being inclined with respect to the suction surface, the flow straightening plate portion being continuously formed from the inclined plate portion
(Continued)

and extending in a direction substantially perpendicular to the suction surface and toward the downstream side.

8 Claims, 5 Drawing Sheets (51) Int. Cl.
*B61D 27/00* (2006.01)
*F24F 13/06* (2006.01)
*F24F 13/08* (2006.01)
*F24F 7/007* (2006.01)

(52) U.S. Cl.
CPC .......... *B61D 27/0018* (2013.01); *F24F 7/007* (2013.01); *F24F 13/06* (2013.01); *F24F 13/082* (2013.01); *F24F 2013/088* (2013.01)

(58) Field of Classification Search
CPC .............. B60L 11/1874; B60L 11/1877; B60L 11/1879; B60L 11/1887; B60L 1/003; B60L 2240/34; H01M 10/5004; Y02T 10/7022; Y02T 10/7061; Y02T 90/34; B61D 27/009; B61D 27/0018; B60H 1/00371; B60H 1/247; F24F 7/007; F24F 13/06; F24F 13/082

USPC .................................................. 454/143, 108
See application file for complete search history.

(56) References Cited

FOREIGN PATENT DOCUMENTS

| JP | U-2-96517 | 8/1990 |
| JP | U-3-23737 | 3/1991 |
| JP | A-2001-215048 | 8/2001 |
| JP | A-2001-322544 | 11/2001 |
| JP | A-2004-340497 | 12/2004 |
| JP | 2006-194459 A | 7/2006 |
| JP | A-2008-82681 | 4/2008 |
| JP | A-2008-241142 | 10/2008 |
| JP | A-2010-221921 | 10/2010 |

OTHER PUBLICATIONS

International Search Report issued in International Patent Application No. PCT/JP2012/007174 dated Feb. 12, 2013.

\* cited by examiner

Fig. 6
Comparative Example

AIR CONDITIONER AND RAILCAR

TECHNICAL FIELD

The present invention relates to an air conditioner including a suction grill and a railcar including the air conditioner.

BACKGROUND ART

Conventionally known is a railcar air conditioner to which outside air is introduced, through a vent hole by a ventilation fan and to which air in a room is introduced through a vent hole by a fan (PTL 1). According to the an conditioner described in PTL 1, the air introduced through the vent hole is cooled by an evaporator or heated by a heater to be supplied to a room through an air outlet. The vent hole through which the air in the room is introduced is formed on a ceiling of the room, and an internal structure of the air conditioner can be seen through the vent hole, so that a visual quality is poor. In addition, since the internal structure is visible, it is handled carelessly, and internal devices may be damaged.

CITATION ON LIST

Patent Literature

PTL 1: Japanese Laid-Open Patent Application Publication No. 2010-221921

PTL 2: Japanese. Laid-Open Patent Application Publication No. 2004-34007

SUMMARY OF INVENTION

Technical Problem

Here, for example, PTL 2 proposes the structure of a suction grill configured such that the internal structure of an air conditioning unit is less visible. According to the air conditioning unit including, the suction grill, horizontal bars can block the lines of sight, so that the internal structure is less visible through a suction port. However, this air conditioning unit has a problem that since surfaces of the horizontal bars are curved surfaces, it is difficult to form the curved surfaces by which is stable air flow that changes little can be obtained, so that noises (air flow noises) due to the change in the flow of the air tend to be generated.

The present invention was made to solve the above problems, and an object of the present invention is to provide an air conditioner that suppresses the generation of air flow noises and whose internal structure is less visible, and a railcar including the air conditioner.

Solution to Problem

In order to solve the above problems, an air conditioner according to the present invention includes: a suction port; a suction grill provided at the suction port and including a plurality of bars spaced apart from one another and arranged substantially parallel to one another, and a suction surface located at suction-side end portions of the plurality of bars; and an air blower configured to suction air from the suction port through the suction grill, wherein each of the plurality of bars includes an inclined plate portion and a flow straightening plate portion, which are arranged in this order front the suction surface toward a downstream side of flow of the air, the inclined plate portion being inclined with respect to the suction surface, the flow straightening plate portion being continuously formed from the inclined plate portion and extending in a direction substantially perpendicular to the suction surface and toward the downstream side.

According to this configuration, the flow of the air can be straightened by the flow straightening plate portions of the plurality of bars, and the generation of air flow noises due to the change in the direction of the flow of the air can be suppressed. In addition, since the flow straightening plate portions are provided to extend in a direction substantially perpendicular to the suction surface, horizontal components can be prevented from being added to the flow velocity of the air flowing along the flow straightening plate portions, and the generation of the air flow noises due to the increase in the flow velocity can be suppressed. Since the inclined plate portions of the plurality of bars are inclined with respect to the suction surface, the inclined plate portions can block the lines of sight, so that the internal structure at the back of the suction grill can be made less visible from the upstream side of the suction grill.

In order to solve the above problems, a railcar according to the present invention includes: the above air conditioner; and a carbody including a room, wherein the suction port is formed on to ceiling surface of the room.

This configuration relates to the railcar including the above air conditioner.

Advantageous Effects of Invention

According to the present invention, the above configuration the generation of the air flow noises can be suppressed, and the internal structure of the air conditioner can be made less visible.

DESCRIPTION OF EMBODIMENTS

Hereinafter, preferred embodiments of a railcar (including an air conditioner) according to the present invention will be explained in reference to the drawings. In the following embodiments, "front" denotes a rail cat traveling direction, "rear" denotes a direction opposite to the railcar traveling direction, and a "front-rear direction" coincides with a "railcar longitudinal direction (rail direction)". In addition, "left" denotes a left side when facing the traveling direction, "right" denotes a right side when facing the traveling direction, and a "left-right direction" coincides with a "railcar width direction (crosstie direction)".

Figure 1:
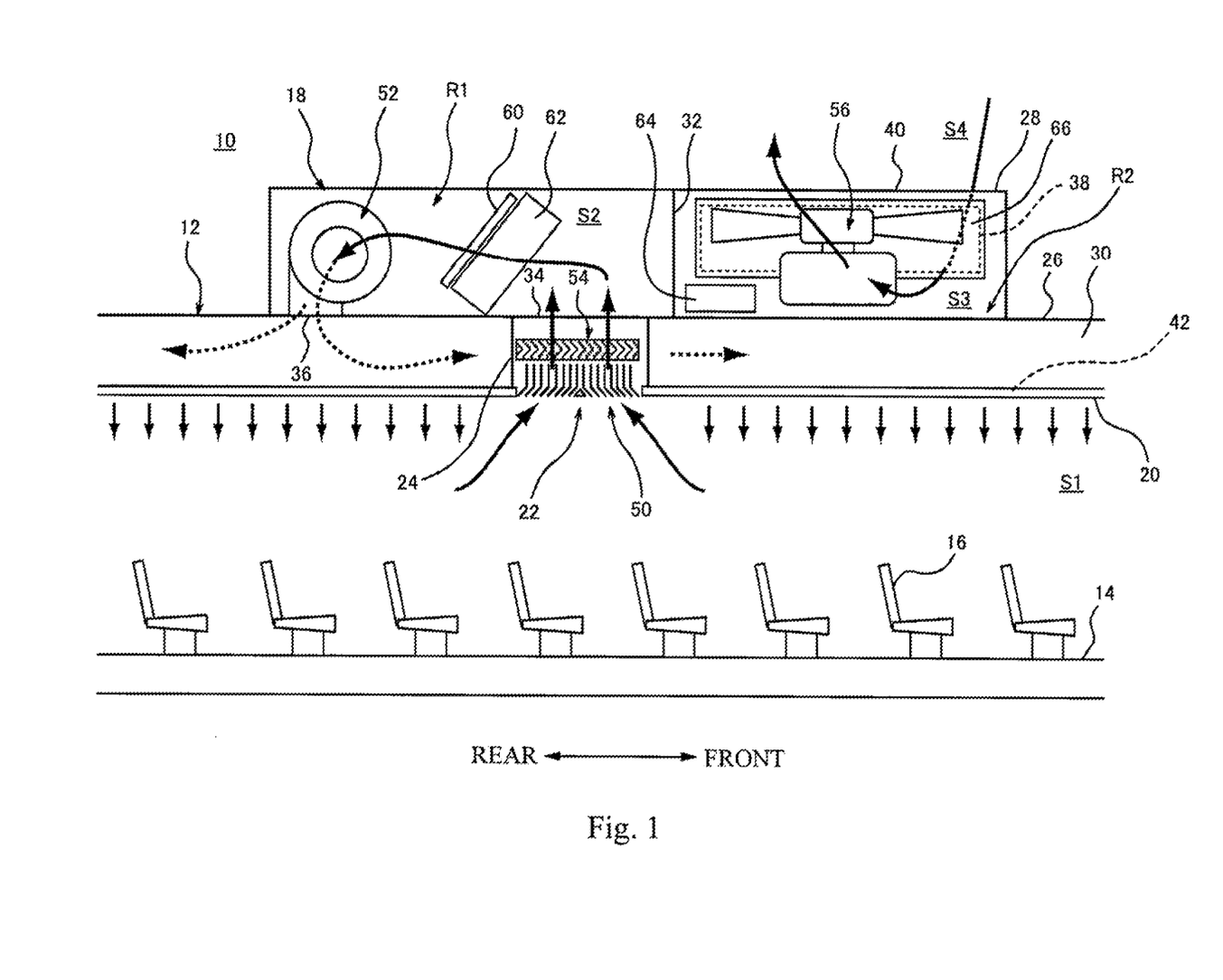
FIG. 1 is a schematic cross-sectional view showing the configuration of a railcar (including an air conditioner) according to embodiment.

FIG. 1 is a schematic cross-sectional view showing the configuration of a railcar 30 (including an air conditioner 18) according to an embodiment. In FIG. 1, arrows denote the flow of air. As shown in FIG. 1, the railcar 10 includes: a carbody 12 including a room S1 that accommodates passengers; a plurality of seats 16 provided on a floor surface 14 of the room S1; and the air conditioner 18 incorporated in an upper portion of the carbody 12.

As shown in FIG. 1, the air conditioner 18 includes: a substantially quadrangular suction port 22 provided at a railcar width direction middle portion of a ceiling surface 20 of the room S1; a suction duet 24 provided to extend upward from the suction port 22 and having a substantially quadrangular cross section; a casing 28 provided to extend upward from a roof 26 of the carbody 12; and two ceiling ducts 30 provided at a rear side of the ceiling surface 20 of the room S1 to extend in the front-rear direction and be spaced apart from each other in the left-right direction (In FIG. 1, only the left ceiling duct 30 is shown).

As shown in FIG. 11, the casing 28 is formed in a substantially case shape. An internal space of the casing 28 is divided by a dividing wall 32 into a first chamber S2 located behind the dividing wall 32 and a second chamber S3 located in front of the dividing wall 32. One return air inlet 34 and two return air outlets 36 (In FIG. 1, only one of the two return air outlets 36 is shown) are formed on a bottom surface of the first chamber S2. An upper end portion of the suction duct 24 is connected to the return air inlet 34, and the two ceiling ducts 30 are respectively connected to the return air outlets 36. An outside air inlet 38 through which outside air is taken in and an outside air outlet 40 through which the outside air taken in through the outside air inlet 38 is discharged are formed on a side surface of the second chamber S3.

As shown in FIG. 11, one of the ceiling ducts 30 is arranged at a left side of the suction duct 24 its the railcar width direction, and the other ceiling duct 30 is arranged at a right side (not shown) of the suction duct 24 in the railcar width direction. Slit-shaped air outlets 42 are provided on the ceiling surface 20 of the room S1 so as to be respectively located next to the two ceiling ducts 30 and respectively extend in the front-rear direction along the ceiling duets 30. The air outlets 42 respectively communicate with the ceiling ducts 30 through communication passages (not shown).

As shown in FIG. 1, the air conditioner 18 includes: a suction grill 50 provided at the suction port 22; an indoor air blower 52 arranged in the first chamber S2 of the casing 28 and configured to suction air from the suction port 22 through the suction grill 50; a flow straightening portion 54 arranged downstream of the suction grill 5O and upstream of the indoor air blower 52 and configured to straighten the air having flowed through the suction grill 50; and an outdoor air blower 56 arranged in the second chamber S3 of the casing 28 and configured to take the outside air in through the outside air inlet 38 and discharge the outside air through the outside air outlet 40. Further, the air conditioner 18 includes: a heater 60 and evaporator 62 arranged in the first chamber S2; a compressor 64 and condenser 66 arranged in the second chamber S3; and a controller (not shown) configured to control the heater 60 and the compressor 64. Therefore, a return air channel R1 is formed in the air conditioner 18 so as to extend from the room S1 through the suction grill 50, the flow straightening portion 54, the evaporator 62, the heater 60, the indoor air blower 52, the ceiling duct 30, and the air outlet 42 back to the room S1. In addition, an outside air channel R2 is formed in the air conditioner 18 so as to extend from an outside S4 of the easing 28 through the outside air inlet 38, the condenser 66, the outdoor air blower 56, and the outside air outlet 40 back to the outside S4. By driving the compressor 64 by the controller (not shown), return air flowing through the return air channel R1 can be cooled by the evaporator 62, or by driving the heater 60 by the controller (not shown), the return air flowing through the return air channel R1 can be heated by the heater 60.

Figure 2:
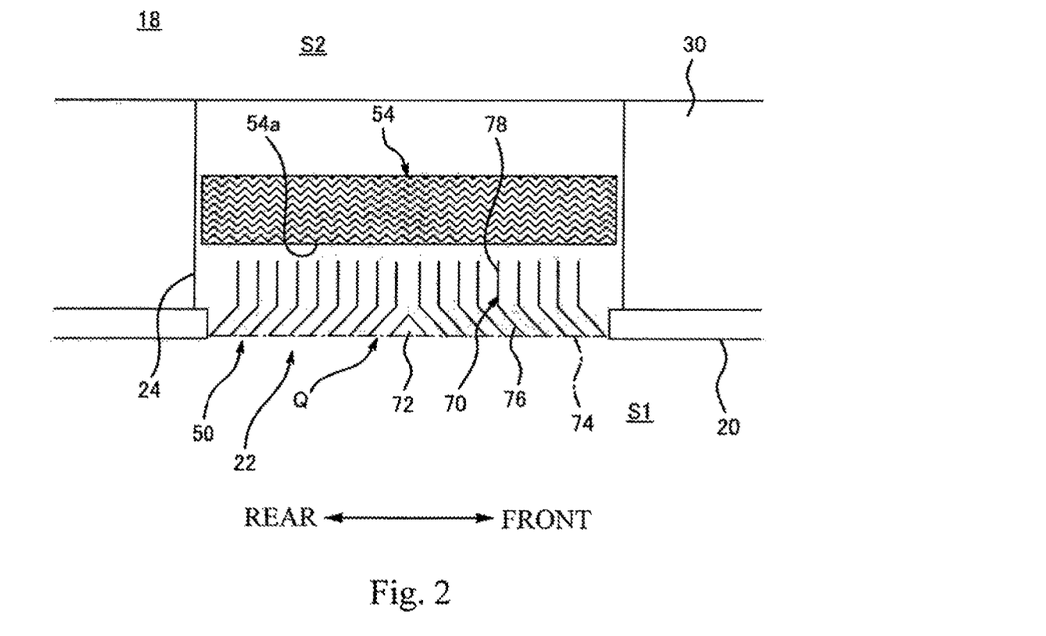
FIG. 2 is a schematic cross-sectional, view showing the configurations of major components of the air conditioner.
Figure 3:
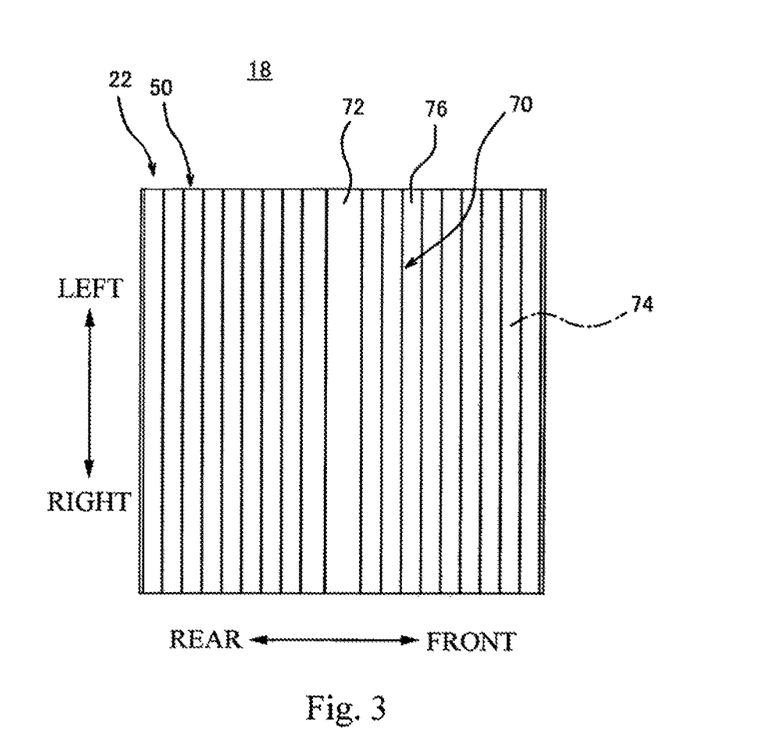
FIG. 3 is a bottom view showing the configuration of a suction grill.
Figure 4:
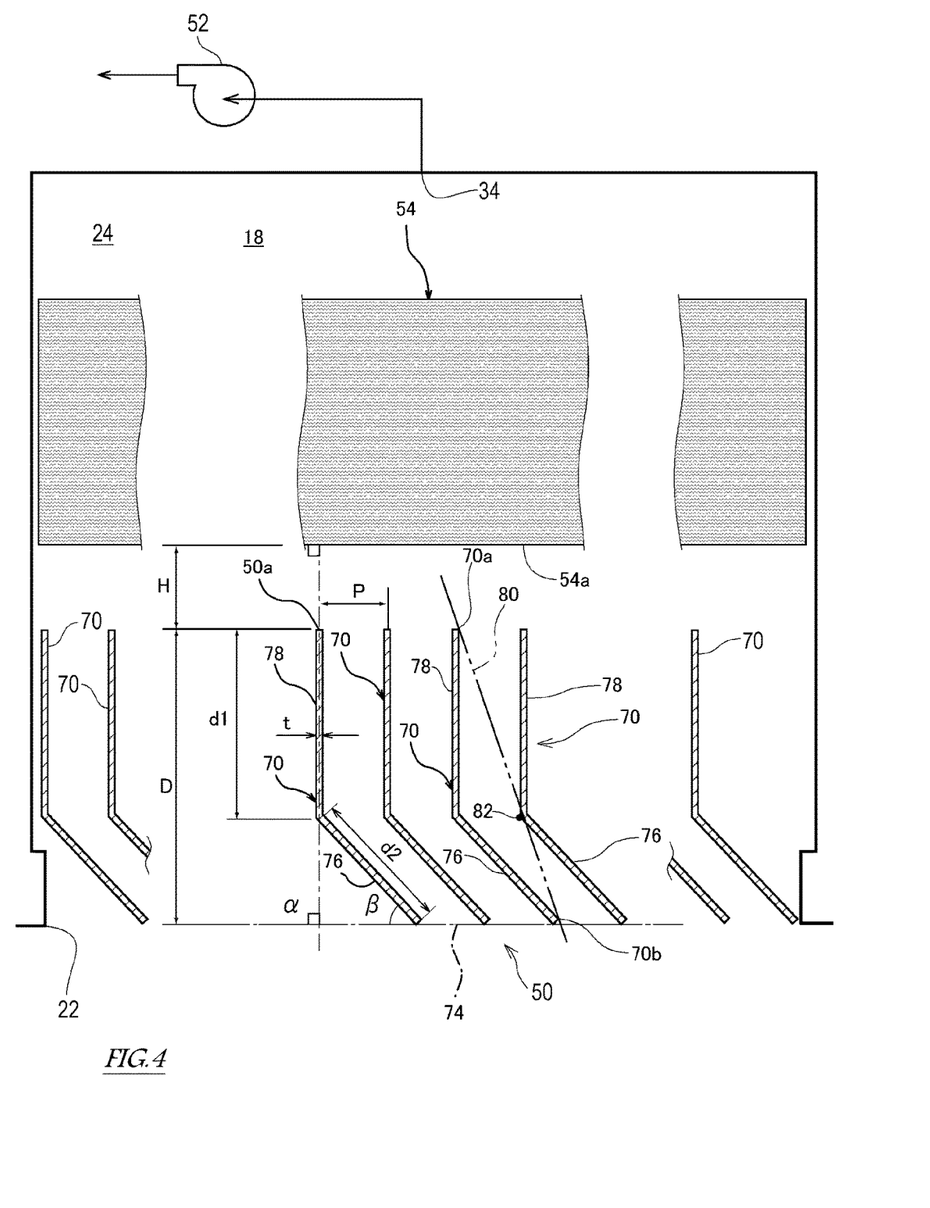
FIG. 4 is a schematic cross-sectional view showing the configurations of the suction grill and a flow straightening portion.
Figure 5:
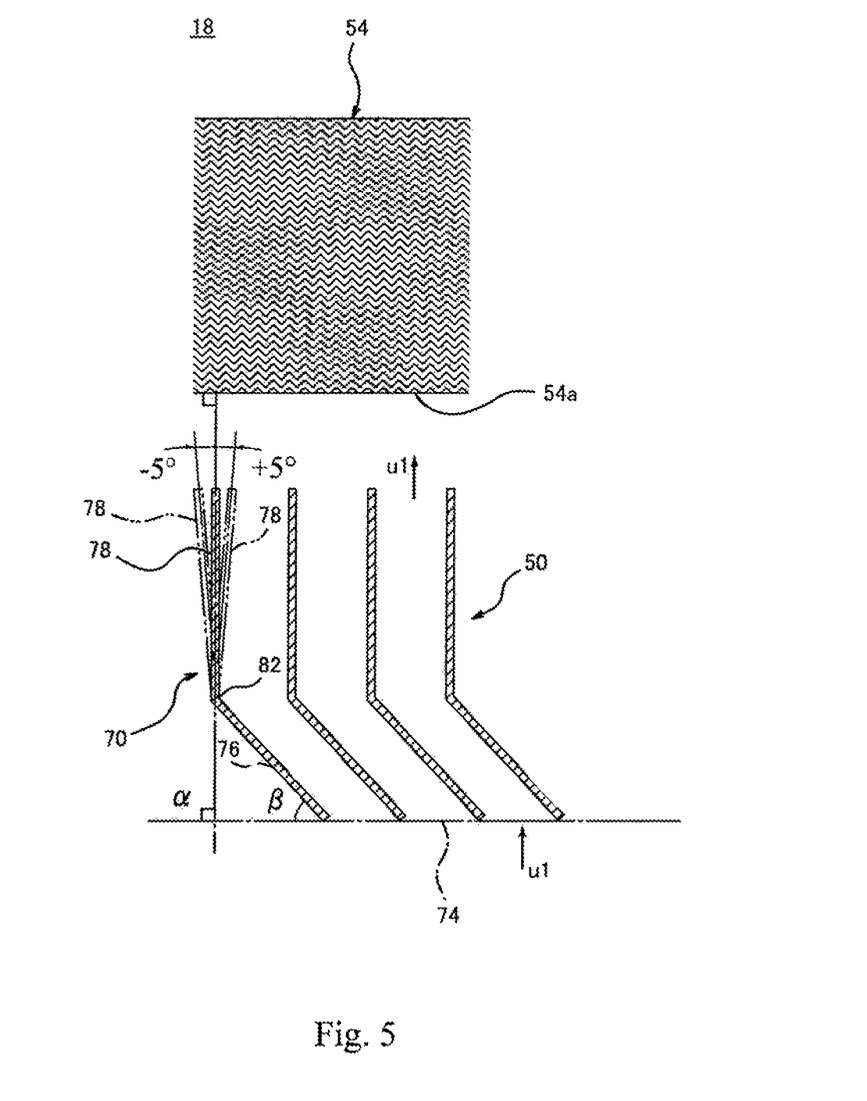
FIG. 5 is a schematic cross-sectional, view showing the configurations of the suction grill and the flow straightening portion.

FIG. 2 is a schematic cross-sectional, view showing the configurations of major components of the air conditioner 18. FIG. 3 is a bottom view showing the configuration of the suction grill 50. Each of FIGS. 4 and 5 is a schematic cross-sectional view showing the configurations of the suction grill 50 and the flow straightening portion 54. As shown in FIGS. 2 and 3, the suction grill 50 is provided at the suction port 22 to, for example, block the lines of sight of passengers. The suction grill 50 includes: a plurality of bars 70 spaced apart from one another in the front-rear direction, extending in the railcar width direction, and arranged substantially parallel to one another; and a blind member 72 arranged at a front-rear direction middle portion of the suction port 22 to extend in the railcar width direction. In addition, as shown in FIG. 4, the suction grill 50 includes a suction surface 74 located at suction-Side end portions of the plurality of bars 70, The suction surface 74 is a virtual flat surface including the suction-side end portions of the plurality of bars 70 and is a reference surface used as a reference when defining below-described inclination angles $\alpha$ and $\beta$.

As shown in FIG. 4, each of the plurality of bars 70 includes an inclined plate portion 76 and a flow straightening plate portion 78, which are arranged in this order from the suction surface 74 toward the downstream side of the flow of the air, the inclined plate portion 76 being inclined with, respect to the suction surface 74, the flow straightening plate portion 78 being continuously formed from the inclined plate portion 76 and extending in a direction substantially perpendicular to the suction surface 74 and toward the downstream side. As shown in FIG. 2, in the present embodiment, inclination directions of the inclined plate portions 76 of the bars 70 arranged in front of the blind member 72 are opposite to those of the inclined plate portions 76 of the bars 70 arranged behind the blind member 72. The inclined plate portions 76 of the bars 70 arranged in front of the blind member 72 extend forward as they get close to the suction surface 74, and the inclined plate portions 76 of the bars 70 arranged behind the blind member 72 extend backward as they get close to the suction surface 74.

As shown in FIG. 5, the angle $\alpha$ of the flow straightening plate portion 78 with respect to the suction surface 74 is within a range of ±20° based on 90° (that is, $70° \le \alpha \le 110°$). It is most desirable that the angle $\alpha$ be within a range of ±5° based on 90° (that is, $85° \le \alpha \le 95°$). If the angle $\alpha$ significantly deviates from 90°, a direction, in which the air is straightened cannot be caused to coincide with the direction in which the suction duet 24 extends, so that it becomes difficult to stabilize the flow of the air. In addition, if the angle $\alpha$ significantly deviates from 90°, horizontal components are added to the flow of the air, and this increases the flow velocity. With this, air flow noises generated when the air hits the flow straightening portion 54 increases.

As shown in FIG. 5, the inclination angle p of the inclined plate portion 76 with respect to the suction surface 74 is not smaller than 25° and not larger than 55°. If the inclination angle $\beta$ is smaller than 25°, vortices are generated in the air flow at a boundary 82 between the flow straightening plate portion 78 and the inclined plate portion 76, and this increases the air flow noises. If the inclination angle β is larger than 55°, a pitch p between the adjacent bars 70 needs to be reduced to block the lines of sight, so that the number of bars 70 increases, and this increases the weight and cost.

As shown in FIG. 4, in a case where a length of each bar 70 in a direction perpendicular to the suction surface 74 is denoted by D, a length d1 of each flow straightening plate portion 78 in the above direction is not shorter than 0.35 D and not longer than 0.65 D. If the length d1 of the flow straightening plate portion 78 is shorter than 0.35 D, a flow straightening effect of the flow straightening plate portion 78 cannot be adequately achieved. If the length d1 of the flow straightening plate portion 78 is longer than 0.65 D, a length d2 of the inclined plate portion 76 becomes short, so that the pitch p between, the adjacent bars 70 needs to be reduced to adequately achieve the effect of blocking the lines of sight by the inclined plate portion 76. In this case, the number of bars 70 increases, and this increases the weight and cost.

As shown in FIG. 4, at each of the front and rear sides of the blind member 72, one of two adjacent bars 70 among the plurality of bars 70 is referred to as a first bar, and the other bar 70 located at a side where the inclined plate portion 76 of the first bar is inclined toward the suction surface 74 is referred to as a second bar. In a ease where a Hat surface including both a downstream side end edge 70a and upstream side end edge 70b of the first bar is referred to as a virtual reference surface 80, at least a part of the boundary 82 between the flow straightening plate portion 78 and inclined plate portion 76 of the second bar is located at the first bar side of the virtual reference surface 80. To be specific, an interval (pitch) p between the adjacent bars 70 is set such that at least a part of the boundary 82 is arranged at the first bar side of the virtual reference surface 80. As shown in FIG. 2, the blind member 72 is formed in a substantially rod shape having a substantially triangular cross section so as to be located at a gap Q between the bar 70 arranged in front of the blind member 72 and the bar 70 arranged behind the blind member 72 and be able to block the lines of sight while securing the gas permeability. Therefore, the internal, structure at the back of the suction grill 50 cannot be seen from the room S1.

As shown in FIG. 4, it is desirable that the pitch p be large as long as the effect of blocking the lines of sight is not lost. To be specific, if the pitch p is small, the number of bars 70 increases, and the opening area of the suction grill 50 becomes small. Thus, the flow velocity necessary to obtain the same flow rate increases. The air flow noises increase substantially in proportion to the sixth power of the flow velocity, and the pressure toss increases substantially in proportion to the square of the flow velocity. Therefore, to reduce the air flow noises and the pressure loss, it is desirable that the pitch p be as large as possible. Here, in the present embodiment, the pitch p is set such that a thickness t of the bar 70 and the pitch p satisfy a relation "p>4t".

As shown in FIG. 4, the flow straightening portion 54 has a function of straightening the flow of the air and a function of catching dust in the air. In the present embodiment, an air filter including a large number of holes through which the air flows is used as the flow straightening portion 54. The flow straightening portion 54 is arranged downstream of the suction grill 30 and upstream of the indoor air blower 52. An upstream main surface 54a of the flow straightening portion 54 is arranged substantially parallel to the suction, surface 74 and substantially perpendicular to the flow straightening plate portion 78. As shown in FIG. 4, in a case where the length of each bar 70 in the direction perpendicular to the suction surface 74 is denoted by D, an interval H between a downstream end surface 50a of the suction grill 50 and the upstream main surface 54a of the flow straightening portion 54 is not shorter than 0 and not longer than 2 D. If the interval H is longer than 2 D, the direction of the air flow tends to change between the downstream end surface 50a of the suction grill 50 and the upstream main surface 54a of the flow straightening portion 54, and the generation of the air flow noises cannot be adequately suppressed.

As shown in FIG. 1, when the indoor air blower 52 is driven, the air in the room S1 is suctioned from the suction port 22 through the suction grill 50, and the air returns to the room S1 through the flow straightening portion 54, the evaporator 62, the heater 60, the indoor air blower 52, the ceiling duct 30, and the air outlet 42. As shown in FIG. 5, while the air is flowing through the suction grill 50, the horizontal components are not added to a flow velocity u1 of the air, so that the flow velocity u1 of the air at an inlet of the suction grill 50 and the flow velocity u1 of the air at an outlet of the suction grill 50 are the same as each other.

Effects Of Embodiment

Since the railcar 10 according to the present embodiment includes the air conditioner 18, the following effects can be obtained.

As shown in FIG. 5, the flow of the air can be straightened by the flow straightening plate portions 78 of the plurality of bars 70, and the generation of the air flow noises due to the change in the direction of the flow of the air can be suppressed. Since the flow straightening plate portions 78 extend in a direction substantially perpendicular to the suction surface 74, the horizontal components can be prevented from being added to the flow velocity u1 (FIG. 5) of the air flowing along the flow straightening plate portions 78. Thus, the generation of the air flow noises clue the increase in the flow velocity can be suppressed.

Figure 6:
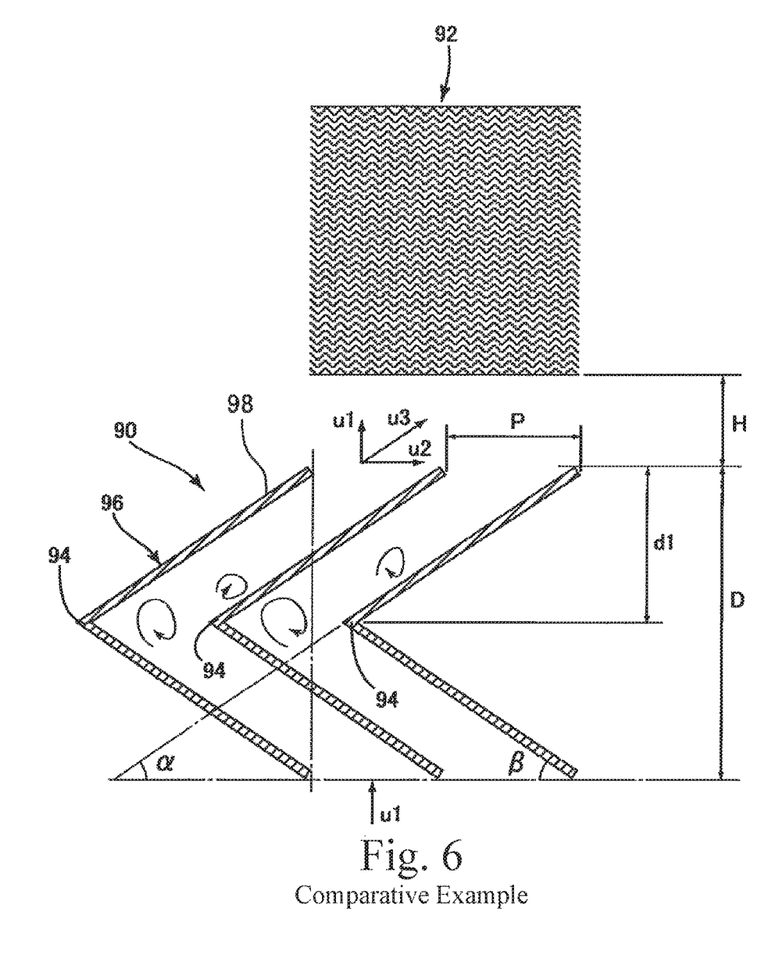
FIG. 6 is a schematic cross-sectional view showing the configurations of the suction grill and the flow straightening portion according to Comparative Example.

FIG. 6 is a schematic cross-sectional view showing the configurations of a suction grill 90 and a flow straightening portion 92 according to Comparative Example. The suction grill 90 according to Comparative Example is designed such that; each of the angle α and the inclination, angle β is set to 34°; and a bar 96 is bent at 68° at the boundary 94. In Comparative Example, while the air is flowing along flow straightening plate portions 98, horizontal, components u2 are added to the flow velocity u1 of the air. Therefore, a flow velocity u3 of the air that hits the flow straightening portion 92 increases (u3>u1), and the air flow noises generated when the air hits the flow straightening portion 92 increase. In addition, when the air greatly curves along the boundary 94, vortices (shown by arrows in FIG. 6) are generated. Therefore, the air flow noises generated at the boundary 94 increase. As shown in FIG. 5, in the suction grill 50 according to the present embodiment, the angle α of the flow straightening plate portion 78 with respect to the suction surface 74 is within a range of ±20° based on 90°. Therefore, the horizontal components can be prevented item being added to the flow velocity u1 of the air, and the generation of the air flow noises at the flow straightening portion 54 can be suppressed, in addition, the generation of the vortices at the boundary 82 can be suppressed, and the generation of the air flow noises due to the vortices can be suppressed.

The present inventors conducted an experiment for comparing the levels of the air flow noises on the basis that: regarding the suction grill 50 (FIG. 4) according to the present embodiment, D was set to 22 mm, H was set to 23 mm, d1 was set to 11 mm, p was set to 9.5 mm, α was set to 90°, and β was set to 34°, and regarding the suction grill 90 (FIG. 6) according to Comparative Example, D was set to 22 mm, H was set to 23 mm, d1 was set to 11 mm, p was set to 16.6 mm, α was set to 34°, and β was set to 34°. This experiment confirmed that the air flow noises of the suction grill 50 were much lower than those of the suction grill 90 at a frequency higher than 500 Hz.

As shown in FIG. 4, since the inclination angle β of the inclined plate portion 76 with respect to the suction surface 74 is 25° or larger, the generation of the vortices at the boundary 82 can be suppressed, and the generation of the air flow noises due to the generation of the vortices can be suppressed. In addition, since the inclination angle β is 55° or smaller, the pitch p between the adjacent bars 70 can be increased to block the lines of sight. Thus, the number of bars 70 can be reduced, so that the weight and cost can be reduced.

As shown in FIG. 4, since the inclined plate portions 76 of the plurality of bars 70 are inclined with respect to the suction surface 74, the inclined plate portions 76 can block the lines of sight, so that the internal structure at the back of the suction grill 50 can be made less visible from the upstream side of the suction, grill 50. Especially, in the present embodiment, since at least a part of the boundary 82 between the flow straightening plate portion 78 and inclined plate portion 76 of the second bar out of the two adjacent bars 70 is located at the first bar side of the virtual reference surface 80, the internal structure at the back of the suction grill 50 cannot be viewed at all from the upstream side of the suction grill 50.

As shown in FIG. 2, the upstream main surface 54a of the flow straightening portion 54 is arranged substantially parallel to the suction surface 74 and substantially perpendicular to the flow straightening plate portion 78. Therefore, the horizontal components can be prevented from being added to the flow velocity of the air when the air is supplied to the main surface 54a. Thus, the generation of the air flow noises due to the increase in the flow velocity and the change in the direction of the air flow can be suppressed. Since the air filter Is used as the flow straightening portion 54, it is unnecessary to separately provide the flow straightening portion 54 and the other air filter. Thus, the entire device can be reduced in size, and the maintainability can be improved.

As shown in FIG. 4, in a case where the length of each bar 70 in the direction perpendicular to the suction surface 74 is denoted by D, the length d1 of the flow straightening plate portion 78 in the above direction is not shorter than 0.35 D and not longer than 0.65 D. Therefore, the flow straightening effect of the flow straightening plate portion 78 can be adequately achieved, and the effect of blocking the lines of sight by the inclined plate portion 76 can be adequately achieved.

As shown in FIG. 4, the interval H between the downstream end surface 50a of the suction grill 50 and the upstream main surface 54a of the flow straightening portion 54 is not shorter than 0 and not longer than 2 D. Therefore, the direction of the flow of the air changes little therebetween, so that the generation of the air flow noises can be adequately suppressed.

Other Embodiments

Figure 7:
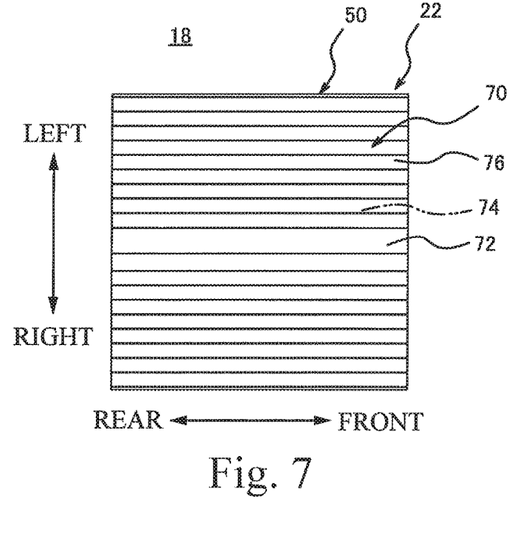
FIG. 7 is a bottom view showing the configuration of the suction grill of the air conditioner according to another embodiment.

As shown in FIG. 3, in the above embodiment, the plurality of bars 70 constituting the suction grill 50 are arranged so as to be spaced apart from one another in the front-rear direction. However, as shown in FIG. 7, in the other embodiment, the plurality of bars 70 constituting the suction grill 50 may be arranged so as to be spaced apart from one another in the left-right direction.

The directions of the inclined plate portions 76 of the suction grill 50 are symmetric with respect to the blind member 72 in the left-right direction. However, the present embodiment is not limited to this, and all the inclined plate portions 76 may be arranged in the same direction. In this case, the blind member 72 does not have to be provided.

As shown in FIG. 1, the above embodiment has explained a railcar that travels on rails. However, the above embodiment is applicable to various railcars, buses, and other transportation facilities. In the other embodiment, instead of the flow straightening portion 54, a flow straightening portion having only the flow straightening function and a filter having only the function of catching dust may be separately provided. For example, a metal mesh having a large number of holes may be used as the flow straightening portion.

REFERENCE SIGNS LIST 10 railcar
18 air conditioner
22 suction port
50 suction grill
70 bar
74 suction surface
76 inclined plate portion
78 flow straightening plate portion

The invention claimed is:

1. An air conditioner comprising:
a suction port;
a suction grill provided at the suction port and including
a plurality of bars spaced apart from one another and arranged substantially parallel to one another, and
a suction surface located at suction-side end portions of the plurality of bars; and
an air blower configured to suction air from the suction port through the suction grill, wherein
each of the plurality of bars includes an inclined plate portion and a flow straightening plate portion, wherein the flow straightening plate portion is downstream of the inclined plate portion with respect to the suction grill, the inclined plate portion is inclined with respect to the suction surface and with respect to a substantially perpendicular direction to the suction surface, the flow straightening plate portion being continuously formed from the inclined plate portion and extending in the substantially perpendicular direction to the suction surface and toward the downstream side,
an inclination angle of the inclined plate portion with respect to the suction surface is not smaller than 25° and not larger than 55°, and
in a case where: one of two adjacent bars among the plurality of bars is referred to as a first bar; the other bar located at a side where the inclined plate portion of the first bar is inclined toward the suction surface is referred to as a second bar; and a flat surface including both a downstream side end edge and upstream side end edge of the first bar is referred to as a virtual reference surface,
at least a part of a boundary between the flow straightening plate portion and the inclined plate portion of the second bar is located at the first bar side of the virtual reference surface, and a pitch p between the adjacent first bar and second bar is set such that a thickness t of at least one of the first bar and second bar and the pitch p satisfies a relation p>4 t.

2. The air conditioner according to claim 1, further comprising a flow straightening portion arranged downstream of the suction grill and upstream of the air blower and configured to straighten the air having flowed through the suction grill.

3. The air conditioner according to claim 2, wherein an upstream main surface of the flow straightening portion is arranged substantially parallel to the suction surface.

4. The air conditioner according to claim 2, wherein the flow straightening portion is an air filter including a large number of holes through which the air flows.

5. The air conditioner according to claim 1, wherein an angle of the flow straightening plate portion with respect to the suction surface is within a range of ±20° based on 90°.

6. The air conditioner according to claim 1, wherein in a case where a length of each of the plurality of bars in a direction perpendicular to the suction surface is denoted by D, a length d1 of the flow straightening plate portion in the above direction is not shorter than 0.35 D and not longer than 0.65 D.

7. The air conditioner according to claim 2, wherein in a case where a length of each of the plurality of bars in a direction perpendicular to the suction surface is denoted by D, an interval H between a downstream end surface of the suction grill and an upstream main surface of the flow straightening portion is not shorter than 0 and not longer than 2 D.

8. A railcar comprising:
   the air conditioner according to claim 1; and
   a carbody including a room, wherein
      the suction port is formed on a ceiling surface of the room.

* * * * *